United States Patent [19]

Hori et al.

[11] Patent Number: 4,904,843
[45] Date of Patent: Feb. 27, 1990

[54] AC TIG WELDING APPARATUS USING HOT WIRE

[75] Inventors: Katsuyoshi Hori; Yasuhiro Butsusaki, both of Kure; Toshiaki Takuwa, Yokohama; Yoshiaki Matsumura, Kure, all of Japan

[73] Assignee: Babcock-Hitachi Kabushiki Kaisha, Tokyo, Japan

[21] Appl. No.: 271,880

[22] Filed: Nov. 16, 1988

[30] Foreign Application Priority Data

Nov. 19, 1987 [JP] Japan .................. 62-290550

[51] Int. Cl.$^4$ ............................... B23K 9/10
[52] U.S. Cl. .................. 219/137 PS; 219/130.51; 219/136
[58] Field of Search ............ 219/137 PS, 123, 130.51, 219/137.2

[56] References Cited

U.S. PATENT DOCUMENTS

| | | | |
|---|---|---|---|
| 4,366,362 | 12/1982 | Ohta et al. | 219/137 PS |
| 4,467,176 | 8/1984 | Mizuno et al. | 219/137.71 |
| 4,485,293 | 11/1984 | Tabata et al. | 219/130.31 |
| 4,614,856 | 9/1986 | Hori et al. | 219/137 PS |

FOREIGN PATENT DOCUMENTS

| | | |
|---|---|---|
| 0139249 | 5/1985 | European Pat. Off. . |
| 3103247 | 1/1982 | Fed. Rep. of Germany . |
| 2503604 | 10/1982 | France . |
| 62-130773 | 6/1987 | Japan . |

Primary Examiner—Clifford C. Shaw
Attorney, Agent, or Firm—Antonelli, Terry & Wands

[57] ABSTRACT

An unconsumable electrode such as tungsten is opposingly arranged with a base metal to be welded. An AC arc welding power supply is connected between the base metal and the unconsumable electrode. A filler wire such as of aluminum is fed by a wire feeder toward an arc-generated part between the base metal and the unconsumable electrode. Also included is a wire-heating power supply for producing a pulsed current. The wire heating power supply heats the filler wire by supplying thereto a pulsed current in accordance with a sync signal from the AC arc welding power supply or a detection signal of an arc current $i_A$ or an arc voltage of the AC arc power supply. The filler wire is thus heated by being supplied with a heating current $i_W$ in pulse form while the unconsumable electrode is kept negative by an AC arc formed between the unconsumable electrode and the base metal. During the period when the unconsumable electrode is kept positive by the AC arc, the filler wire is not supplied with any current or is heated by being supplied only with a sufficiently small current not to cause any substantial magnetic flow. Accordingly, even if a large current flows through the wire, arc interruptions can be eliminated, thereby improving the welding process of aluminum by using an AC TIG arc.

14 Claims, 14 Drawing Sheets

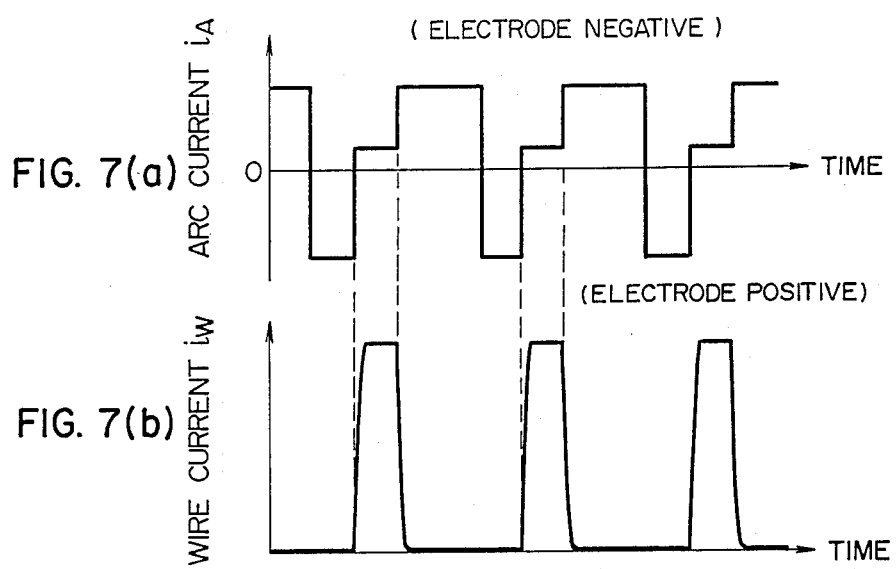
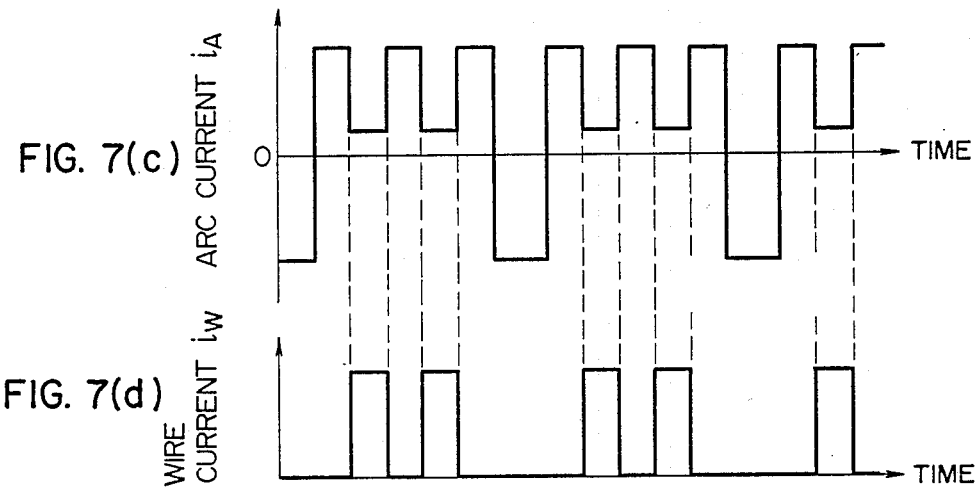

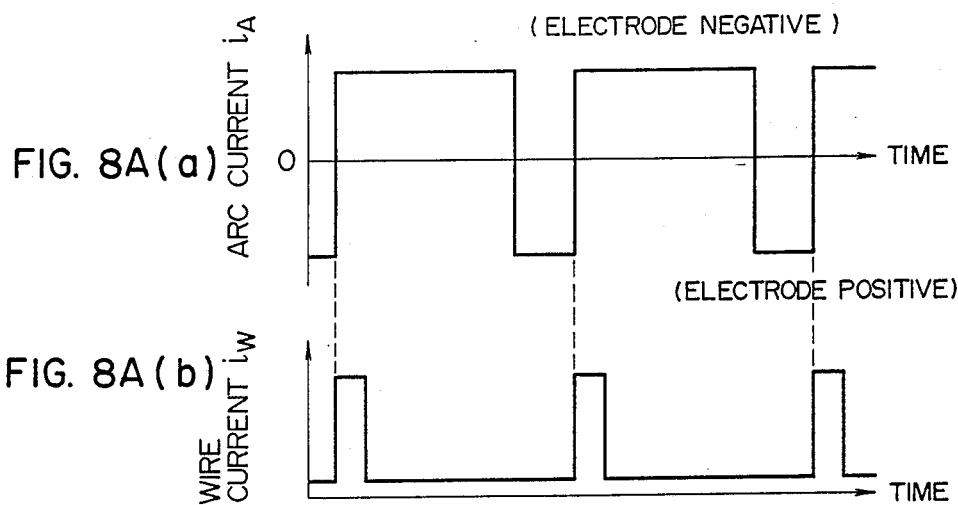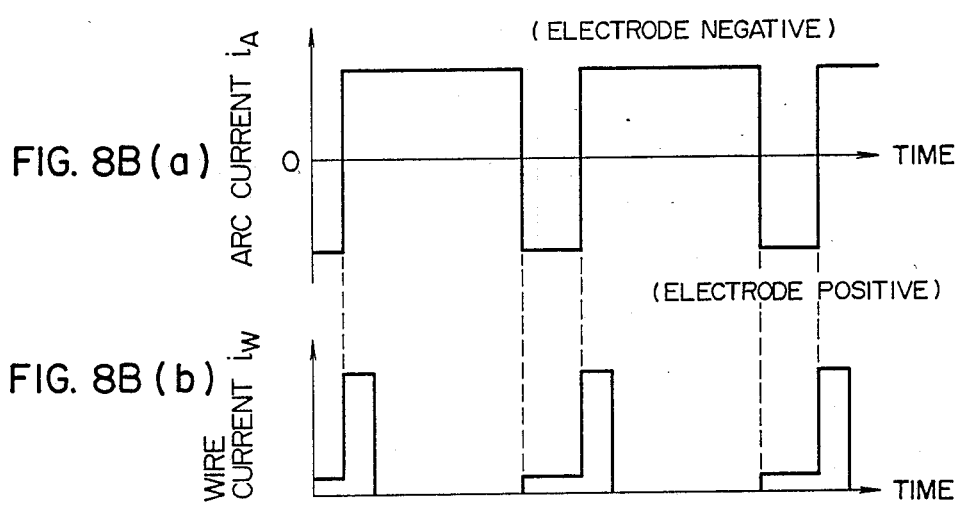

FIG. 12
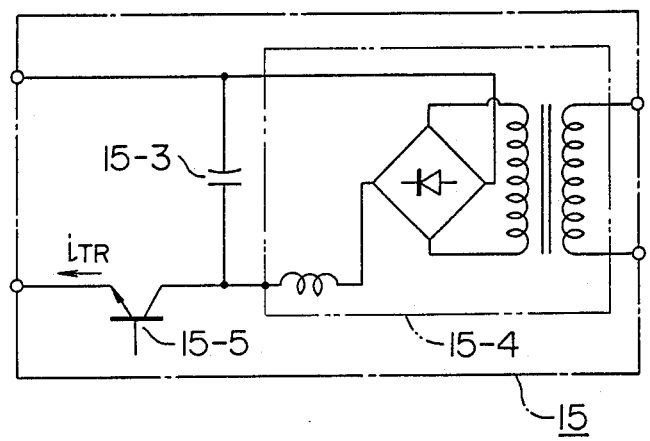
FIG. 13(a)
FIG. 13(b)
FIG. 13(c)
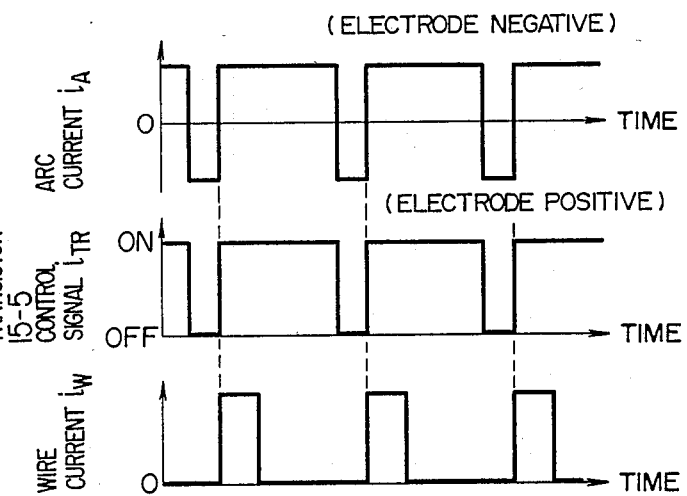

FIG. 14A
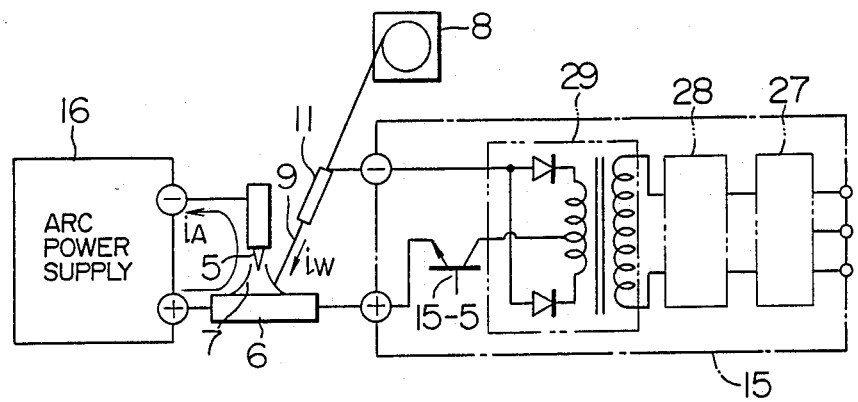
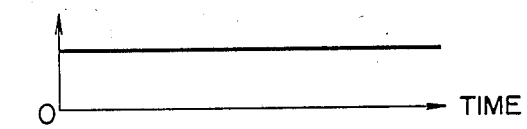
FIG. 14B(a) ARC CURRENT $i_A$
FIG. 14B(b) TRANSISTOR 15-5 CONTROL SIGNAL $i_{TR}$
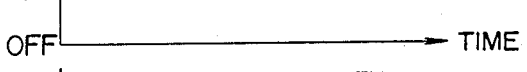
FIG. 14B(c) WIRE CURRENT $i_W$

FIG. 15A
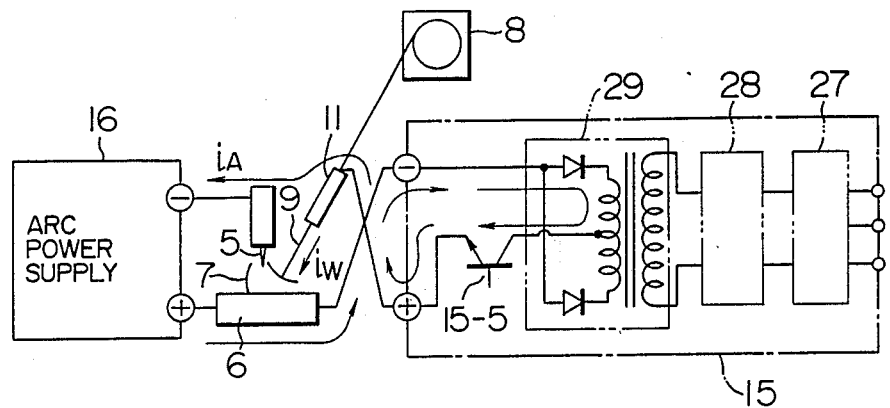
FIG. 15B(a) ARC CURRENT $i_A$
FIG. 15B(b) TRANSISTOR 15-5 CONTROL SIGNAL $i_{TR}$
FIG. 15B(c) WIRE CURRENT $i_W$
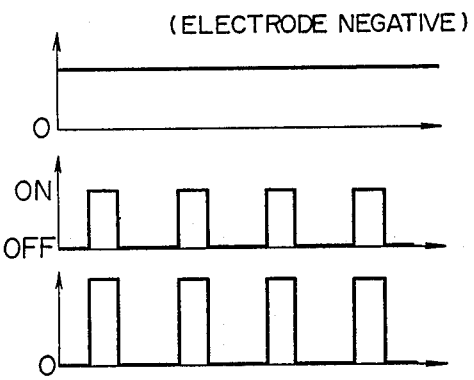

ARC CURRENT $i_A$

TRANSISTOR 15-5
CONTROL SIGNAL
$i_{TR}$

WIRE CURRENT $i_W$

FIG. 17A
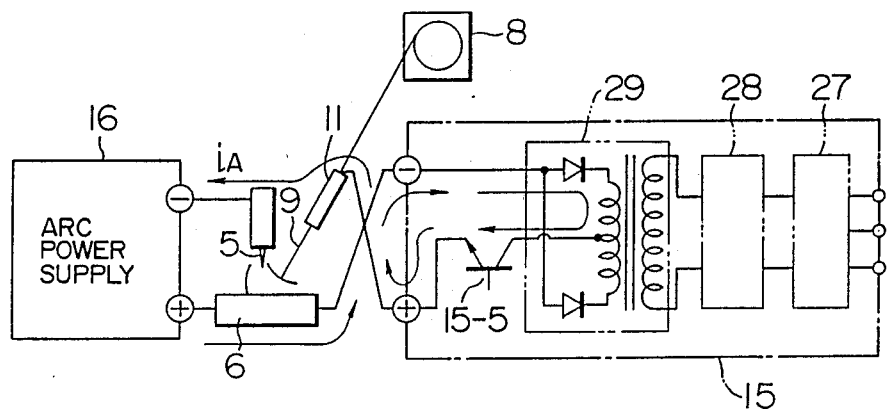
FIG. 17B(a)
ARC CURRENT $i_A$
FIG. 17B(b)
TRANSISTOR 15-5
CONTROL SIGNAL
$i_{TR}$
FIG. 17B(c)
WIRE CURRENT $i_W$
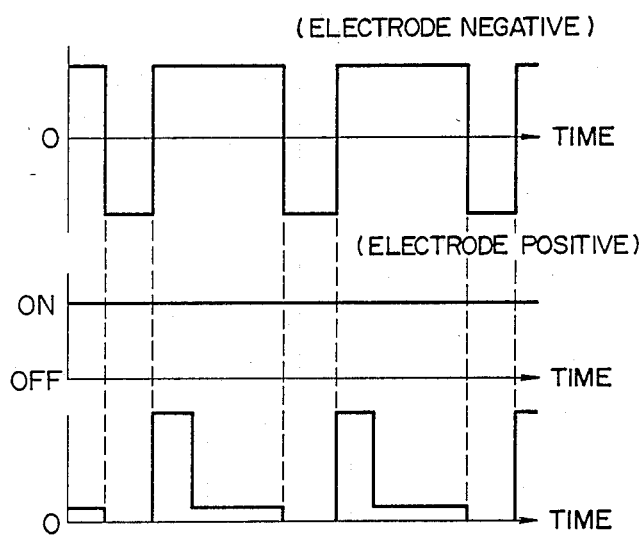

AC TIG WELDING APPARATUS USING HOT WIRE

BACKGROUND OF THE INVENTION

The present invention relates to an unconsumable electrode welding apparatus such as a hot-wire TIG (Tungsten Inert Gas) welding apparatus, or more in particular to an AC TIG welding apparatus using a hot wire suitable for efficient AC arc welding of aluminum or the like.

In welding aluminum or an aluminum alloy, the AC TIG welding process is usually used for a thin plate less than about 5 mm in thickness and the MIG (Metal Inert Gas) welding process for thicker plates. The MIG welding process, which is high in welding rate and small in heat input as compared with the TIG welding process, may have a narrower heat-affected zone with a smaller softened zone and thermal strain. Nevertheless, this welding process has the disadvantage that a blowhole is liable to develop and the corrosion resistance of the deposited metal is comparatively low. Further, this process is not applicable to the welding of a thin plate in view of arc stability and bead formation.

The TIG welding process, on the other hand, in spite of a comparatively low welding rate and a large heat input resulting in a wide heat-affected zone with an increased softened zone and thermal strain, has the advantages of superior bead shape, less blowholes and high corrosion resistance of the deposited metal. A large arc current cannot be used for thin plates due to the problem of melt down, and therefore it is desirable to improve the welding rate without increasing the arc current to reduce the softened zone and thermal strain.

FIG. 1 is a diagram schematically showing a welding apparatus conventionally used for automatic TIG welding of aluminum or aluminum alloys.

As shown in FIG. 1, an AC arc 7 is formed with a base metal 6 by an AC arc power supply 16, a TIG torch 4 and tungsten electrode 5, and a filler wire 9 is guided to the weld zone through a conduit 10 by use of a wire supply unit 8. The weld zone is thus fused by the arc 7 thereby to form a deposited bead 13. A water cooling system and a shield gas system for the torch 4 are not shown. An inert gas such as argon gas is caused to flow out of the torch 4 to shield the weld zone.

In the TIG welding of aluminum, in which an oxide film on the surface of the base metal 6 would make the welding process difficult, the AC arc 7 is used to allow a period to form a negative pole of the arc at the base metal 6 and an oxide in the surface of the base metal 6 is broken by the impact of ions entering the negative pole in what is called "the cleaning action". The TIG welding process conducted while removing an oxide film this way is the most common practice for welding aluminum. On the other hand, the TIG welding of copper or copper alloys commonly uses a DC electrode negative polarity. In welding aluminum bronze or beryllium bronze, however, the welding process is facilitated by the use of an AC arc producing the cleaning action. In the conventional AC TIG arc welding process, a deposited metal is generally formed by melting with the arc a filler wire made of what is called a "cold wire" which is not heated by conduction of electricity.

An AC TIG arc power supply for producing a square wave AC current by switching a DC current is often used as a power supply for arc. An example of such an arc current designated by $i_4$ is shown in FIG. 2. The period of this waveform is set to 7 ms, of which the term of, say, 1 ms of the half wave of the electrode positive polarity, forming a negative pole of the base metal, is adjusted to approximately 1.5 ms length thereby regulating the degree of the cleaning action of the arc.

The use of a hot wire in AC TIG arc welding process increases the wire melting rate and therefore is expected to improve the efficiency of the welding work. The welding process with hot wire has not been used in the past for aluminum or aluminum alloys, however, probably because the small specific resistivity of these metals requires a large current in Joule heating, often causing a excessive magnetic blow of the arc.

The hot wire TIG welding process is often used in combination with the DC TIG welding process for carbon steel, stainless steel or the like. This process uses as a wire heating current a DC or AC (Reference: Hot Wire; J. F. Saenger; Welding and Metal Fabrication, June 1971, or a DC pulse (U.S. Pat. No. 4,614,856) for protection against arc magnetic blow.

An experiment conducted by the inventors on a combination of the AC TIG arc with a wire heating power supply of this type shows that the arc is so unstable that the likelihood of arc interruptions poses a bottleneck to the applicability, especially to aluminum.

A mere combination of a hot-wire heating power supply with the AC TIG arc poses the problem of unstable arc and the resulting inapplicability of the hot-wire welding. A study of the cause of this problem in aluminum welding has revealed that when the unconsumable electrode is positive producing the cleaning effect, the arc wanders seeking an oxide in the base metal surface (Reference: Welding Arc Phenomena; Kohei Ando, et al.; July 1962, p. 141 to 144), and if the wire is supplied with current during this time, the magnetic blow of the arc due to the magnetic field generated by the wire current aggravates the arc instability with the result that the arc is liable to be interrupted.

SUMMARY OF THE INVENTION

The primary object of the present invention is to provide an unconsumable-electrode welding apparatus which is efficient, high in welding rate and superior in practical applications without any unstable phenomenon such as arc interruptions or magnetic blow.

Another object of the present invention is to provide an unconsumable-electrode welding apparatus which is high in both quality and economic value with an improved welded joint by narrower heat-affected zone.

In order to achieve these objects, there is provided according to the present invention an unconsumable-electrode welding apparatus such as a hot-wire AC TIG welding apparatus comprising an unconsumable electrode such as tungsten arranged in opposedly spaced relationship with a base metal to be welded, an AC arc welding power supply connected between the base metal and the unconsumable electrode, a filler wire such as aluminum fed toward an arc-generated part formed between the base metal and the unconsumable electrode, and wire feed means for feeding the filler wire.

The welding apparatus described above further comprises a wire-heating power supply for producing a pulsed current. This heating power supply is adapted to heat the filler wire by applying a pulsed current thereto in response to a synchronous signal from the AC arc power supply or a signal produced by detection of an arc current or an arc voltage of the AC arc power supply. A heating current in pulse form is applied to the filler wire thereby to heat the same during the period when the unconsumable electrode remains negative due to the AC arc formed between the unconsumable electrode and the base metal. During the period when the unconsumable electrode is kept positive by the AC arc, the wire is not supplied with any current, or is heated with a sufficiently small current as not to substantially cause any magnetic blow.

If a pulsed current of high peak value is applied to the filler wire while the unconsumable electrode remains negative in polarity (with the arc in electrode negative polarity half wave) in synchronism with an AC arc in the above-mentioned manner, the magnetic blow of arc caused during the energization like in No. JP-A-62-130773 (Japanese Patent Application No. 60-271343) does not substantially hamper the welding process if the duration of the magnetic blow is comparatively short. The wire is not substantially energized during a half cycle of electrode positive polarity when the arc is unstable, and therefore arc interruptions which would otherwise pose a bottleneck of smooth welding work are not caused.

BRIEF DESCRIPTION OF THE DRAWINGS

Preferred embodiments of the present invention will now be described in conjunction with the accompanying drawings, in which:

FIGS. 7(a), (b), (c) and (d) are diagrams showing arc current waveforms and wire current waveforms of an AC TIG welding apparatus according to a second embodiment of the present invention;

FIGS. 8A and 8B are diagrams showing an arc current waveform and wire current waveforms according to the present invention;

FIG. 12 shows another configuration of a wire heating power supply according to the fourth embodiment shown in FIG. 10;

FIGS. 13(a), (b) and (c) are diagrams showing current waveforms produced by the hot-wire welding process using the welding apparatus shown in FIG. 10;

FIGS. 14A, 15A, 16A and 17A show routes of arc current formed under different power conditions according to the present invention; and FIGS. 14B, 15B, 16B and 17B show current waveforms, transistor control signal waveforms and wire current waveforms respectively for FIGS. 14A, 15A, 16A and 17A.

DESCRIPTION OF THE PREFERRED EMBODIMENTS

An AC TIG welding apparatus according to the present invention will be described in detail with reference to embodiments.

Figure 3:
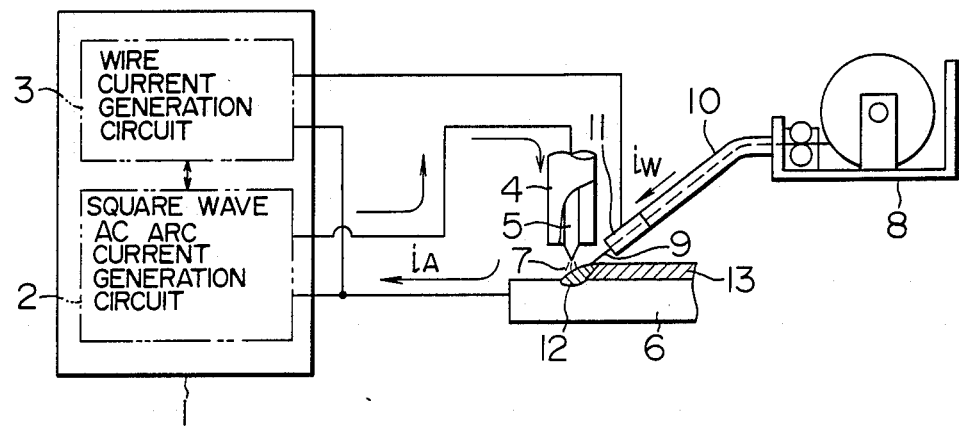
FIG. 3 is a diagram schematically showing an AC TIG welding apparatus using hot wire according to a first embodiment of the present invention.

A configuration of an AC TIG welding apparatus using hot wire according to a first embodiment of the present invention is shown schematically in FIG. 3.

Figure 1:
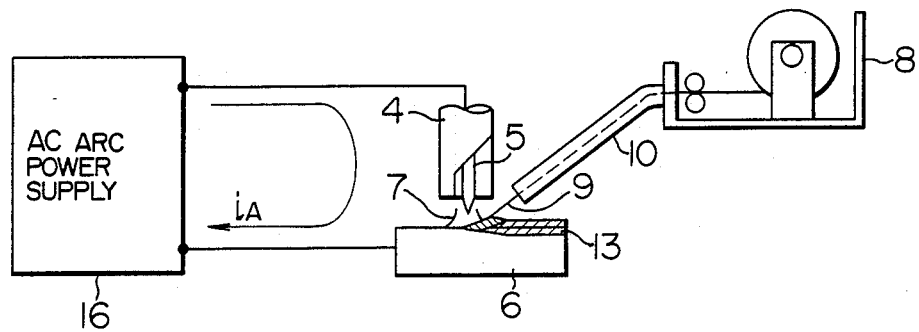
FIG. 1 is a diagram schematically showing a configuration of a conventional welding apparatus.
Figure 2:
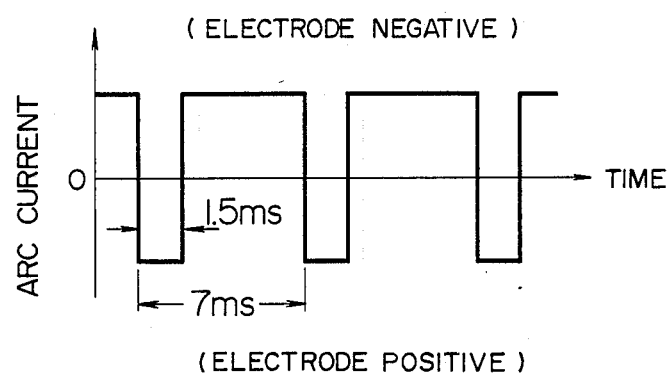
FIG. 2 shows a waveform of arc current for the conventional welding apparatus shown in FIG. 1.

In FIG. 3, the reference numerals identical to those in FIG. 1 designate the same component elements respectively as in FIG. 1.

Numeral 1 designates a welding power supply including a square wave AC arc current generation circuit 2 and a wire current generation circuit 3 for producing a pulsed current. The wire current generation circuit 3 makes up a wire heating power supply for producing a pulsed current in synchronism with the AC arc current generation circuit 2. Numeral 4 designates a TIG torch, and numeral 5 a tungsten electrode constituting an unconsumable electrode which forms an arc 7 with a base metal 6. Numeral 8 designates a wire feeder unit for feeding a filler wire 9 which is guided to a weld zone by a conduit 10 into contact with the base metal 6. The conduit 10 has at the forward end thereof a contact tip 11 connected to one of the wire current output terminals of the welding power supply 1. A current flows between the contact tip 11 and the base metal 6 to heat the filler wire, so that the melted filler wire 9 is fixed with a part of the base metal fused by the arc 7, thereby forming a molten pool 12 and a welding bead 13.

Figure 4:
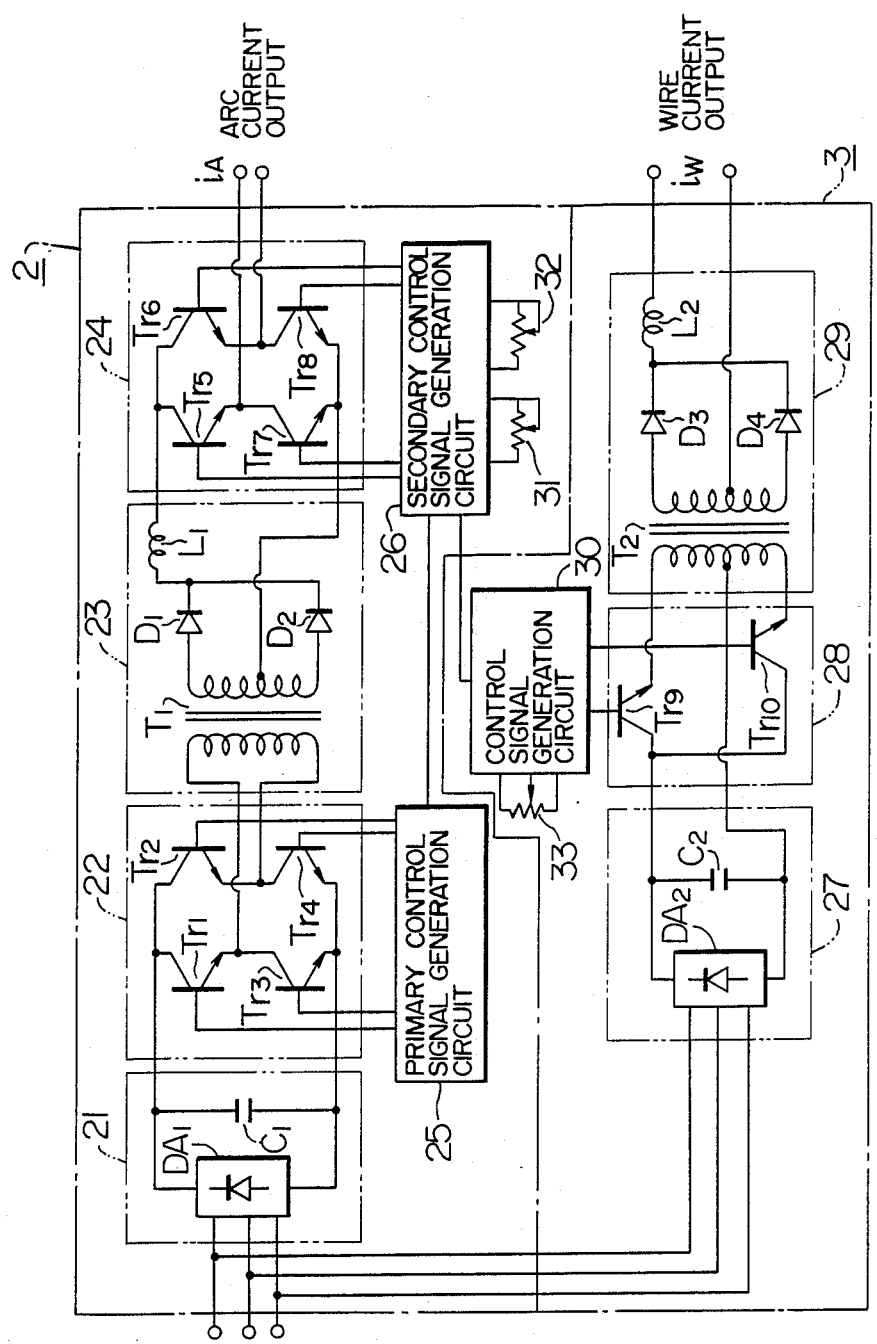
FIG. 4 is a diagram showing an electrical circuit of a welding power supply shown in FIG. 3.

FIG. 4 is a diagram showing a specific circuit of the welding power supply 1 in FIG. 3. An output circuit for a square wave AC arc current $i_A$ includes a DC voltage generation circuit 21 having a full-wave rectification diode $DA_1$ and a capacitor $C_1$, a primary transistor switching circuit 22 with transistors $Tr_1$ to $Tr_4$ for switching and converting a voltage generated by the DC voltage generation circuit 21 into an alternating current of approximately 20 kHz, a large current DC circuit 23 with a transformer $T_1$ for transforming the alternating current from the switching circuit 22, diodes $D_1$, $D_2$ for rectifying the transformed voltage and a coil $L_1$ for smoothing the rectified voltage thereby to produce a large direct current, a secondary transistor switching circuit 24 with a bridge of transistors $Tr_5$ to $Tr_8$ for producing a square wave alternating current of about 100 Hz from the DC output of the large direct current circuit 23, a primary control signal generation circuit 25 for producing a control signal for the primary transistor switching circuit 22, and a secondary control signal generation circuit 26 for producing a control signal for the secondary transistor switching circuit 24.

The DC pulsed current output circuit for the wire heating power supply, on the other hand, includes a primary transistor switching circuit 28 with transistors $Tr_9$ and $Tr_{10}$ for switching and converting the voltage from the DC voltage generation circuit 27 into an AC voltage of about 20 kHz, a DC pulsed current generation circuit 29 with a transformer $T_2$ for transforming the AC voltage from the primary transistor switching circuit 28, diodes $D_3$, $D_4$ for rectifying the transformed voltage and a coil $L_2$ for smoothing the rectified voltage thereby to produce a DC pulsed current, and a control signal generation circuit 30 for producing a control signal for the primary transistor switching circuit 28.

The arc current $i_A$ and an output waveform thereof are controlled by the primary control signal generation circuit 25 for the primary transistor switching circuit 22 and the secondary control signal generation circuit 26 for the secondary transistor switching circuit 24. In particular, the energization period of a positive half wave and a negative half wave of a square wave alternating current is determined in producing an output. An associated synchronous signal is applied also to a control signal generation circuit 30 for the primary transistor switching circuit 28 of the wire heating output circuit thereby to produce a pulsed current $i_W$ for wire energization in synchronism with the arc current waveform.

The primary control signal generation circuit 25 for the primary transistor switching circuit 22 is mainly comprised of integrated circuits for a switching regulator and produces a pulse width control signal for producing an arc current corresponding to a reference voltage from an external source.

Figure 5:
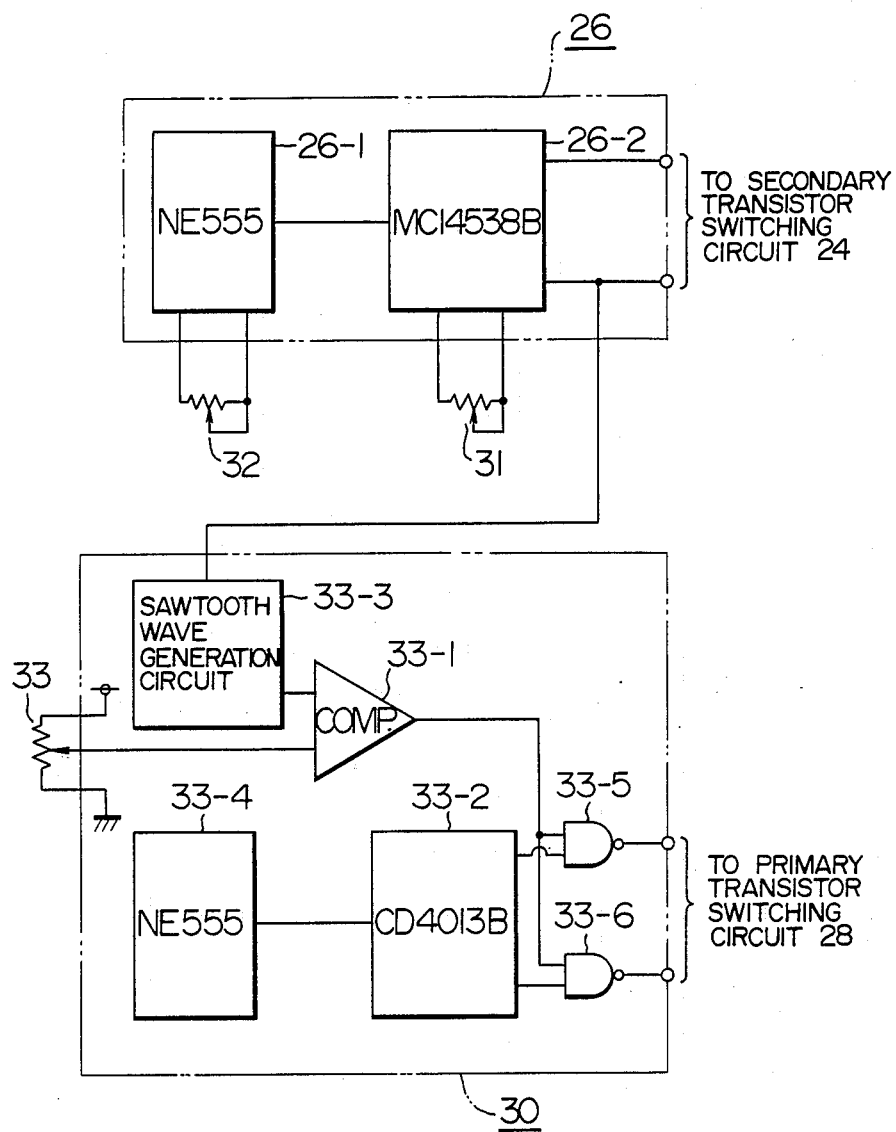
FIG. 5 is a diagram schematically showing a secondary control signal generation circuit and a control signal generation circuit shown in FIG. 4.

FIG. 5 is a diagram schematically showing a configuration of the secondary control signal generation circuit 26 and the control signal generation circuit 30 shown in FIG. 4.

The secondary control signal generation circuit 26 includes an astable multivibrator 26-1 and a monostable multivibrator 26-2 as main components. The "high" and "low" periods of this circuit are regulated by variable resistors 31, 32. Corresponding energization periods of the positive and negative half waves of the square wave alternating current are determined and applied to the secondary transistor switching circuit 24. Also, this signal is applied to the control signal generation circuit 30.

The control signal generation circuit 30, in order to obtain an effective current suitable for a wire feed rate, generates at a sawtooth waveform generation circuit 33-3 thereof a sawtooth wave synchronous with the phase of the AC arc current from the signal of the secondary control signal generation circuit 26, which sawtooth wave is compared with the output from a pulse width regulation variable resistor 33 at a comparator 33-1. A high frequency such as 20 kHz is generated by a oscillator 33-4 and a D-type flip-flop 33-2 and the logical product of this high frequency and the output of the comparator 33-1, is produced from NAND gates 33-5 and 33-6. Thus, a turn-on signal is produced from the control signal generation circuit 30 to the primary transistor switching circuit 28 in synchronism with the phase of the AC arc current when the tungsten electrode turns negative thereby to produce a pulse current for heating the wire.

Figures 6A, 6B:
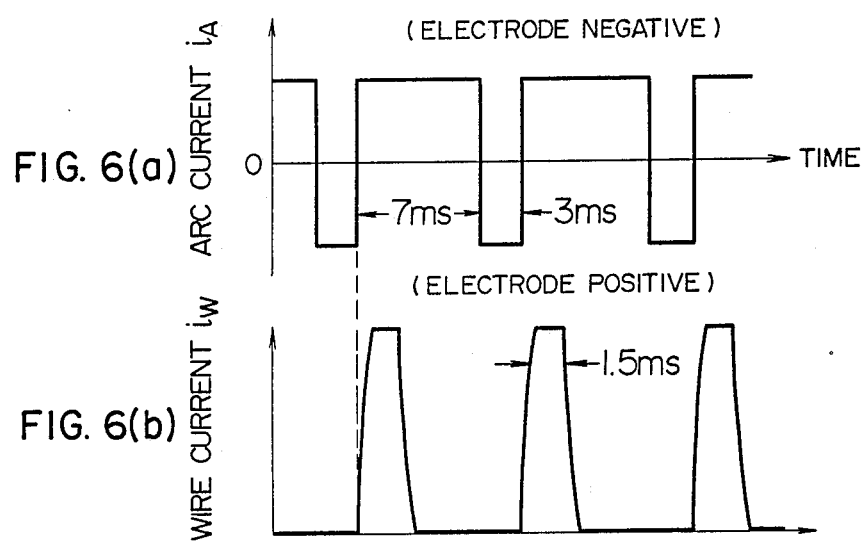
FIGS. 6(a) and (b) are an arc current waveform and a wire current waveform respectively for the welding apparatus shown in FIG. 3.

FIGS. 6(a) and (b) show examples of an arc current waveform $i_A$ (FIG. 6(a)) and a wire current waveform $i_W$ (FIG. 6(b)) respectively produced at the time of hot-wire welding of aluminum by a welding apparatus according to the present invention. An aluminum wire 1.2 mm in diameter is used as a filler wire 9 with the effective current set at 200 A, electrode negative period of the arc current at 7 ms and the period of electrode positive polarity at 3 ms.

The wire current $i_W$, on the other hand, is provided by a pulsed current with a peak value of 500 A which is supplied for a period of 1.5 ms from the time point when the arc reaches an electrode negative state. The wire is energized this way only when the arc is electrode negative polarity, so that arc interruptions during wire energization are eliminated and a satisfactory welding bead is formed with the an aluminum wire of 1.2 mm in diameter fed at the rate of 4 m/min.

In the process, even though the welding work is possible also by supplying the wire current $i_W$ in such a manner as to form a negative pole of the wire 9, the magnetic field generated by the wire current would cause the arc 7 to be magnetically attracted toward the wire 9 and an arc is formed also between the tungsten electrode 5 and the wire 9, with the result that the fusion of the wire 9 is extremely promoted. The wire 9 is thus fused or unstably molten, thereby often disturbing the arc 7.

In the case where the wire 9 is connected to provide a positive pole and energized, by contrast, the arc 7 is blown away from the wire 9 while the wire is energized. An arc is thus prevented from being generated from the wire 9, thus stabilizing the arc 7.

Table 1 shows a specification of the butt welding conducted on an aluminum plate 3 mm in thickness by use of the welding apparatus shown in FIG. 3 to determine conditions capable of welding while forming a beautiful reverse side bead with the same arc current. As a seen, a welding rate as high as 1.3 times higher is attained for the hot-wire welding process than for the cold TIG welding process.

TABLE 1

| Item | Cold TIG | Hot-wire TIG |
| --- | --- | --- |
| Arc current | 180 A | 180 A |
| Wire current (effective value) | 0 A | 94 A |
| Wire feed rate | 1.0 m/min | 1.5 m/min |
| Welding rate | 300 mm/min | 400 mm/min |
| Base metal | 5083-0, 3 mm thick | |
| Wire | 4043 WY, $\phi$1.6 mm | |

In this first embodiment, the arc current takes an AC waveform of almost a simple square wave. Since the arc current has a high value during the wire energization period, the arc is subjected to a magnetic blow for a longer time with the lengthening of the wire energization period as a result of an increased wire feed rate, thus preventing the fusion of the base metal to a greater degree.

FIGS. 7(a), (b), (c) and (d) are diagrams showing an arc current waveform $i_A$ and a wire current waveform $i_W$ according to a second embodiment of the invention comprising means for protection against the above-mentioned problem. In this second embodiment, the arc current is kept at about 50 A or a low current value barely maintaining an arc during a part, say, 3 ms of the wire energization period contained in an electrode negative wave. During this period, the wire is supplied with a current with as high a peak as required for melting the wire, while during the period when the wire is not energized, the arc current is increased to produce an arc current $i_A$ for melting the base metal.

In this way, the welding work is not substantially affected by a sharp magnetic blow which may occur while the arc current is low. As a consequence, the hot-wire AC TIG welding process is accomplished even with a high wire melting rate.

According to the first and second embodiments of the invention described with reference to FIGS. 6, 7(a) and 7(b) respectively, the wire begins to be energized immediately after the arc current takes an electrode negative half waveform. A similar effect is also obtained when the wire is energized some time after an arc is formed such as that shown in FIGS. 7(c) and 7(d) with an arc current of an electrode negative half wave.

In the aforementioned embodiments, the filler wire is energized at all times during the period when an unconsumable electrode forms a negative pole. The present invention is not limited to such a case, but a very small current below 30 A not causing a magnetic blow may be supplied when an unconsumable electrode turns positive with a similar effect.

The diagrams of FIG. 8A and 8B show examples of an arc current waveforms (FIG. 8A(a), FIG. 8B(a) and wire current waveforms (FIGS. 8A(b), FIG. 8B(b)) with the wire energized by a current of such a value below as 30 A; not to cause a magnetic blow during a half wave period of electrode positive polarity.

The first embodiment has been explained with reference to a case in which an AC arc welding power supply is integrally constructed with a wire heating power supply. The wire heating power supply may be formed as a circuit independent of the arc power supply so that a wire heating current may be produced in synchronism with an arc current in response to an AC output of the sync signal from the arc power supply without departing from the spirit of the present invention.

Further, an output voltage or an output current may be detected from an arc power supply, and a wire current may be produced in synchronism with the arc current.

Figure 9:
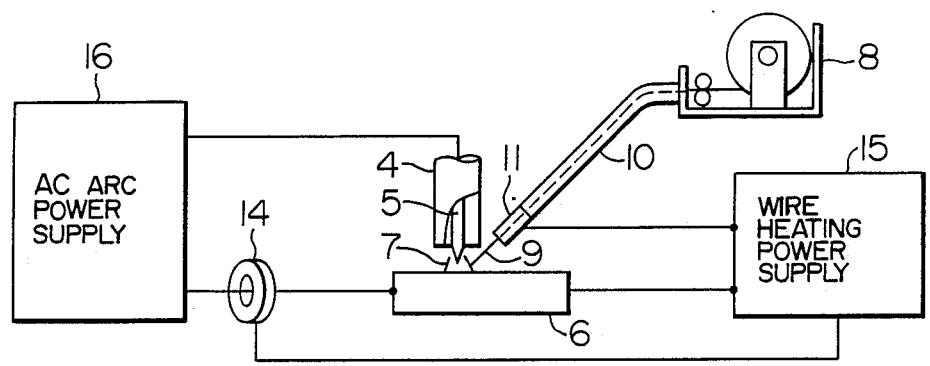
FIG. 9 is a diagram schematically showing a configuration of an AC TIG welding apparatus using hot wire according to a third embodiment of the present invention.

FIG. 9 is a diagram for explaining a third embodiment of the present invention, in which an arc current is detected from an arc power supply 16 by an arc current detector 14 including a Hall element, and the output of a wire heating power supply 15 is controlled in synchronism with the detected signal. This configuration permits the existing AC arc power supply 16 to be used and a hot-wire AC TIG welding apparatus is very economically constructed only by adding a wire heating power supply 15.

In the embodiments of the present invention described above the filler wire 9 is in contact with the base metal 6. When the filler wire 9 is separated from the base metal 6, however, an arc current flows through a route including the tungsten electrode 5, the arc 7 and the base metal 6 in that order and also through a route including the tungsten electrode 5, the filler wire 9, the DC pulsed current generation circuit 29 and the base metal 6. As a result, an arc is caused also from the filler wire 9, thereby disturbing the arc and hampering a smooth progress of the welding operation.

Figure 10:
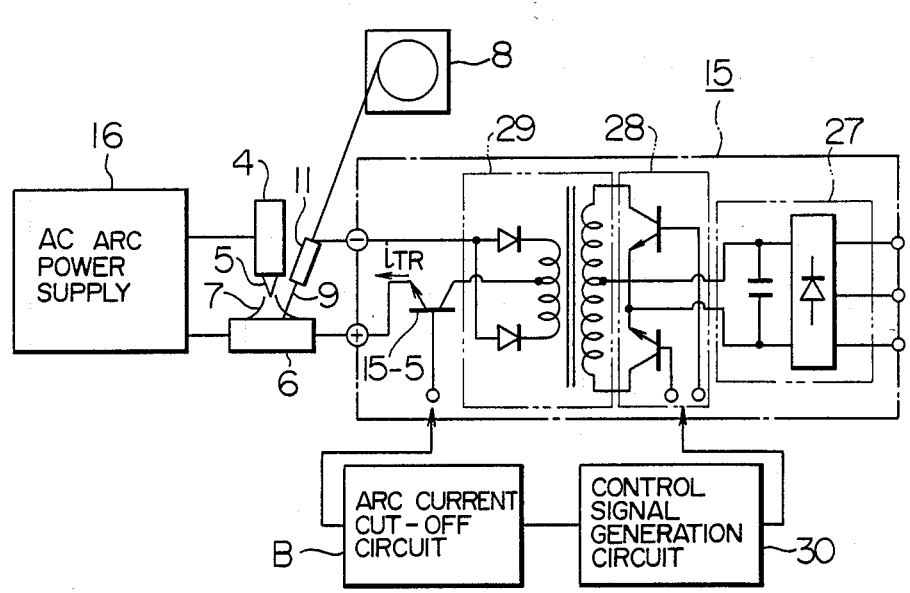
FIG. 10 is a diagram schematically showing a configuration of an AC TIG welding apparatus using hot wire according to a fourth embodiment of the present invention.

FIG. 10 shows a configuration of the wire heating power supply 15 for solving the above-mentioned problem according to a fourth embodiment of the present invention. A transistor 15-5 is connected making up a switching element at the output of a DC pulse current generation circuit 29. Character B designates an arc current cut-off circuit which turns off the transistor 15-5 to prevent the arc current from flowing into the filler wire 9 when the filler wire 9 is separated from the base metal 6.

Figure 11A:
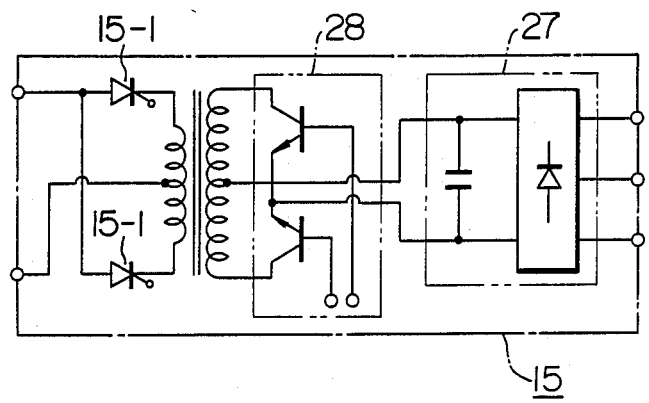
FIGS. 11A, 11B and 11C show other configurations of a wire heating power supply for the fourth embodiment shown in FIG. 10.
Figure 11B:
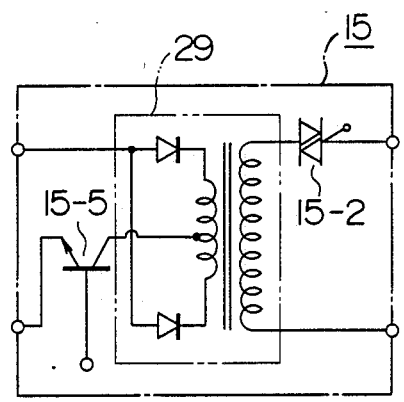
Figure 11C:
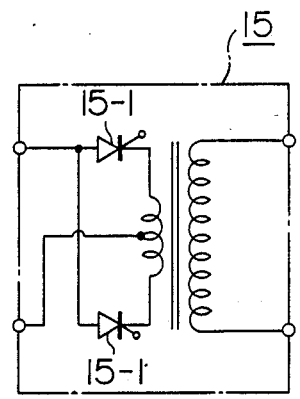

FIGS. 11A, 11B and 11C show other configurations of the wire heating power supply 15 according to the fourth embodiment of FIG. 10. The configuration of FIG. 11A has inserted therein thyristors 15-1 which are capable of performing dual functions as diodes of the DC pulse current generation circuit 29 and as transistor 15-5. The circuit of FIG. 11B is configured to be controlled by a triac 15-2 making up a phase control device for generating a wire pulse, current FIG. 11C shows a circuit configured with only of the thyristors 15-1 after transformation of an input at a transformer. All these configurations attain the same effect as the fourth embodiment shown in FIG. 10.

FIG. 12 shows another configuration of the wire heating power supply 15 according to the fourth embodiment. The output of a DC generation circuit 15-4 is charged in a capacitor 15-3, and the transistor 15-5 is switched to form a pulsed current through the discharge of the capacitor 15-3. The same effect as in the fourth embodiment shown in FIG. 10 is attained also by this embodiment.

FIGS. 13(a), (b) and (c) show an arc current (FIG. 13(a)), a control signal for the transistor 15-5 (FIG. 13(b)) and a wire current (FIG. 13(c)) respectively for the hot-wire welding process using the welding apparatus shown in FIG. 10. An AC TIG welding apparatus of a square waveform is used as the arc power supply 16 in FIG. 10, and a negative output of the wire heating power supply 15 is connected to the filler wire 9 and a positive output thereof to the base metal 6. The wire is controlled to be energized only during the negative stage of the tungsten electrode 5. If the filler wire 9 is away from the base metal 6 when the tungsten electrode 5 is positive, an arc current is ready to flow into the wire 9 through a route including the tungsten electrode 5, filler wire 9, DC pulse current generation circuit 29 and the base metal 6. The transistor 15-5 is thus controlled to turn off during this period (when the tungsten electrode 5 is positive). As a result, the route including the tungsten electrode 5, filler wire 9, DC pulse current generation circuit 29 and the base metal in that order is cut off, so that even when the filler 9 separated from 6 and floats in the arc 7, the arc current is prevented from flowing into the filler wire 9.

Figure 16A:
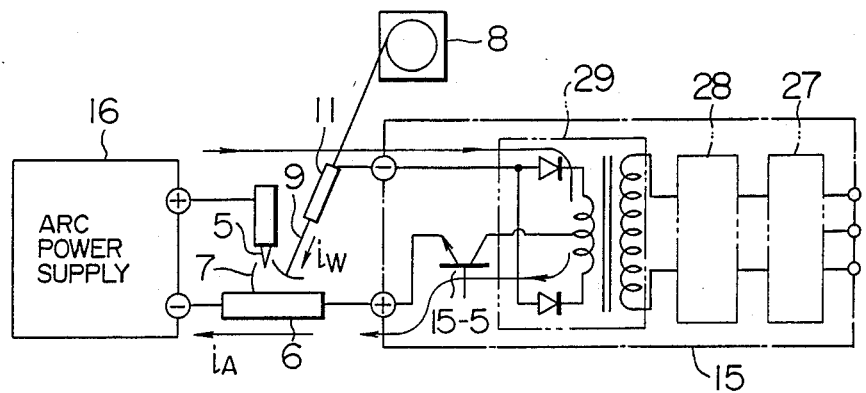
Figure 16B:
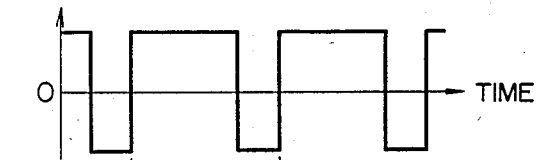
Figure 16B:
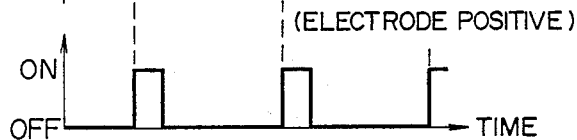
Figure 16B:

FIGS. 14A, 15A and 16A show the routes of the arc current $i_A$ with the filler wire 9 separated from the base metal 6 under the conditions mentioned below in FIG. 10, and FIGS. 14B, 15B and 16B an arc current waveform (a), a transistor 15-5 control signal (b) and a wire current waveform (c), respectively associated therewith.

In FIG. 14, a DC TIG welding apparatus is used as an arc power supply of FIG. 10 with the tungsten electrode 5 connected to a negative terminal and the base metal 6 to a positive terminal. The negative output terminal of the wire heating power supply 15 is connected to the filler wire 9, and the positive terminal thereof to the base metal 6. Assume that the filler wire 9 is separated from the base metal 6 when the transistor 15-5 is turned on in this connection. In view of diodes inserted in the DC pulsed current generation circuit 29, there is no route for the arc current $i_A$ to flow through a route including the base metal 6, transistor 15-5 and the DC pulse current generation circuit 29 in that order into the filler wire 9, and therefore the transistor 15-5 is not required to turn on/off but may always be kept on.

In the circuit of FIG. 15, a DC TIG welding apparatus is used as an arc power supply 16 of FIG. 10 with the tungsten electrode 5 connected to the negative terminal and the base metal to the positive terminal. The positive output terminal of the wire heating power supply 15 is connected to the filler wire 9, and the negative terminal thereof to the base metal 6. If the filler wire 9 is separated from the base metal 6 with the transistor 15-5 turned on in this connection, the arc current $i_A$ is liable to flow through the route including the base metal 6, DC pulse current generation circuit 29, transistor 15-5, filler wire 9 and the tungsten electrode 5 in that order. During the period when the heating of the wire by energization is not desired with the filler wire 9 separated too far from the base metal 6, for example, the transistor 15-5 is kept off.

In FIG. 16, on the other hand, an AC TIG welding apparatus is used as an arc power supply 16 in FIG. 10 with the negative output terminal of the wire heating power supply 15 connected to the filler wire 9 and the positive terminal thereof to the base metal 6. If the filler wire 9 is separated from the base metal 6 with the transistor 15-5 turned on in this connection during the positive state of the tungsten electrode 5, the arc current $i_A$ is liable to flow into the filler wire through a route including the tungsten electrode 5, filler wire 9, DC pulse current generation circuit 29, transistor 15-5 and the base metal 6 in that order. As a result, during the period when it is not desirable to heat the wire by energization with the filler wire 9 separated from the base metal 6, for instance, the transistor 15-5 is turned off.

The same effect as in the embodiment shown in FIG. 10 may be attained also by controlling the transistor 15-5 as in FIGS. 14, 15 and 16.

Also, consider a case in which as shown in FIG. 17, an AC TIG welding apparatus is used as an arc power supply of FIG. 10 with the positive output terminal of the wire heating power supply 15 connected to the filler wire 9 and the negative output terminal thereof to the base metal 6. If the filler ire 9 is detached from the base metal when the transistor is turned on with the tungsten electrode 5 in negative state, part of the arc current $i_A$ is liable to flow into the filler wire 9 through the route including the base metal 6, DC pulse current generation circuit 29, transistor 15-5, filler wire 9 and the tungsten electrode 5 in that order. During the period when the tungsten electrode 5 is positive in polarity, however, the diodes inserted in the DC pulse current generation circuit 29 prevent the arc current $i_A$ from flowing into the filler wire 9 and therefore the welding process is not effected substantially. During the period when it is not desirable to heat the wire by energization with the filler wire 9 separated from the base metal 6, for instance, the transistor 15-5 is turned off.

With the switching off of the transistor 15-5, a spike voltage is caused between the collector and emitter of the transistor 15-5 due to the inductance of the output cable or the like. A circuit for damping the spike voltage (snubber) is therefore generally required. According to the present invention as shown in FIG. 10 and FIG. 13, however, no spike voltage is generated in the transistor 15-5 due to an inductance of the output cable if the primary transistor switching circuit 28 is controlled to form a waveform of the wire current $i_W$ of FIG. 13(c) so that the transistor 15-5 is turned off when the wire current $i_W$ is reduced to zero, that is, when the current $i_{TR}$ flowing in the transistor 15-5 is reduced to zero. The need of a snubber is thus eliminated from the transistor 15-5, thereby simplifying the circuit configuration.

The aforementioned embodiments refer principally to the case of aluminum welding. The base metal and the filler wire according to the present invention, however, are not limited to aluminum, aluminum bronze or bellyrium bronze, but are applicable with equal effect to the hot-wire AC TIG welding process for welding mild steel, carbon steel, low-alloy steel, stainless steel or other high alloys. Also in these cases, the arc in an inert gas ambient wanders seeking an oxide liable to form a negative pole during the half wave period of electrode positive polarity. The arc is therefore stabilized more by cutting off wire current during such a period.

The present invention is not confined to the tungsten electrode used as an unconsumable electrode in the above-mentioned embodiments. Instead, other unconsumable electrodes such as carbon may be also used with equal effect.

The present invention has been described above with reference to the AC TIG welding process, but is also applicable to the AC arc welding processes such as MAG (Metal Active Gas), MIG (Metal Inert Gas) or submerged arc welding for a hot-wire welding with high operating efficiency.

It will thus be understood from the foregoing description that according to the present invention there is provided an unconsumable electrode welding apparatus highly reliable in operation without any magnetic blow or arc interruptions. If this invention is applied to the welding of aluminum or aluminum alloys, for example, the welding efficiency is improved with the deposition rate increased by 1.5 times and the welding rate by 1.3 times for the same arc welding. Further, the heat-affected zone is reduced in size and the heat-affected zone softened less thereby providing an AC TIG welding apparatus superior both in quality and economically for improved welding joint strength.

Furthermore, during the hot-wire welding process according to the present invention, the arc current flowing in the molten metal and the wire current flowing in pulse form function to vibrate the molten pool, so that the blowholes in the molten pool are liable to rise thereby reducing the case of blowholes being formed.

We claim:

1. An AC TIG welding apparatus using a hot wire, comprising:
    a base metal to be welded;
    an unconsumable electrode arranged in opposedly spaced relationship with the base metal;
    an AC arc welding power supply connected between the base metal and the unconsumable electrode;
    a filler wire fed toward an arc-generated part formed between the base metal and the unconsumable electrode;
    wire feeding means for feeding the filler wire;
    a wire heating power supply means for energizing the filler wire; and
    discriminating means for discriminating a period when said unconsumable electrode is kept negative in polarity by an AC arc from a period when said unconsumable electrode is kept positive in polarity by the AC arc, said wire heating power supply means being responsive to a signal from the discriminating means indicative of the polarity of the unconsumable electrode and supplying a wire-heating current $i_w$ in pulse form to the filler wire during the period when the unconsumable electrode is kept negative in polarity by the AC arc, and ceasing the supply of the wire-heating current $i_w$ to the filler wire during the period when the unconsumable electrode is kept positive in polarity by the AC arc.

2. An AC TIG welding apparatus using a hot wire according to claim 1, wherein said wire heating power supply means comprises a power supply for outputting a pulse current to the filler wire, the period of the pulse current being shorter than the period when the uncomsumable electrode is kept negative in polarity.

3. AC TIG welding apparatus using a hot wire according to claim 2 further comprising means for energizing the filler wire at substantially the same time that the uncomsumable electrode turns negative in polarity.

4. An AC TIG welding apparatus using a hot wire according to claim 1, wherein said wire heating power supply means comprises a power supply for energizing the filler wire at the substantially same time that the uncomsumable electrode becomes negative in polarity.

5. An AC TIG welding apparatus using a hot wire according to claim 1, wherein said wire heating power supply means includes a circuit for controlling the pulse width of the pulse current produced from the wire heating power supply.

6. An TIG welding apparatus using a hot wire according t claim 1, wherein said wire heating power supply means includes means for producing a pulsed current in accordance with a sync signal from the AC arc welding power supply.

7. An AC TIG welding apparatus using a hot wire according to claim 1, said discriminating means comprising detection means for detecting selected one of an arc current and an arc voltage of the AC arc welding power supply, the wire-heating power supply means producing a pulsed current in synchronism with a detection signal from the detection means.

8. An AC TIG welding apparatus using a hot wire according to claim 1, wherein the filler wire is made of selected one of aluminum and an aluminum alloy.

9. An AC TIG welding apparatus using a hot wire according to claim 1, wherein the wire-heating power supply means includes an arc current cut-off circuit for preventing the arc current $i_A$ from flowing into the wire heating power supply means through the filler wire.

10. An AC TIG welding apparatus using a hot wire according to claim 9, wherein the arc current cut-off circuit includes means for cutting off the arc current $i_A$ after the current for energizing the filler wire is reduced to zero.

11. An AC TIG welding apparatus using a hot wire according to claim 1, further comprising:
an arc power supply including means for outputting a current by dividing the period when the uncomsumable electrode is kept negative in polarity into a base period of low arc current value and a peak period of high arc current value; and
means for forming a signal to indicate that the filler wire is energized during the base period, whereby the wire heating power supply means receives the signal and outputs a pulsed current whose period is equal to or shorter than that of the base period.

12. An AC TIG welding apparatus using a hot wire according to claim 1, further comprising:
means for forming a signal indicative of the period when said unconsumable electrode is kept negative in polarity by the AC arc and the period when said unconsumable electrode is kept positive in polarity by the AC arc in accordance with an arc current sync signal outputted from the AC arc welding power supply, said wire heating power supply means outputting the wire-heating current in accordance with an output signal from said signal forming means during the period when said unconsumable electrode is kept negative in polarity by the AC arc.

13. An AC TIG welding apparatus using a hot wire according to claim 1, wherein said discriminating means comprises detection means for detecting a selected one of an arc current and an arc voltage of the AC arc welding power supply and means for receiving the detection signal from the detection means and for discriminating the period when said unconsumable electrode is kept negative in polarity by the AC arc from the period when said unconsumable electrode is kept positive in polarity by the AC arc.

14. An AC TIG welding method using an AC TIG welding apparatus which includes a base metal to be welded, an unconsumable electrode arranged in opposedly spaced relationship with the base metal, an AC arc welding power supply connected between the base metal and the unconsumable electrode, a filler wire fed toward an arc-generated part formed between the base metal and the unconsumable electrode, wire feeding means for feeding the filler wire, and a wire heating power supply for energizing the filler wire, said method comprising the steps of:
supplying a wire-heating current $i_W$ in pulse form to the filler wire during a period when the uncomsumable electrode is kept negative in polarity by the AC arc; and
cutting off the wire-heating current $i_W$ to the filler wire during the period when the uncomsumable electrode is kept positive in polarity by the AC arc.

* * * * *